United States Patent [19]

Morel et al.

[11] Patent Number: 4,717,427
[45] Date of Patent: Jan. 5, 1988

[54] METHOD OF MANUFACTURING ZIRCONIUM ALLOY PLATES

[75] Inventors: Michel Morel, Tassin; Jean-Paul Mardon, Caluire, both of France

[73] Assignee: "FRAGEMA", Courbevoie, France

[21] Appl. No.: 817,187

[22] Filed: Jan. 8, 1986

[30] Foreign Application Priority Data

Jan. 10, 1985 [FR] France ............................ 85 00310

[51] Int. Cl.$^4$ .............................................. C22F 1/18
[52] U.S. Cl. ................................. 148/11.5 F; 148/421
[58] Field of Search ................... 148/11.5 F, 133, 421

[56] References Cited

U.S. PATENT DOCUMENTS 3,567,522  3/1971  Thomas et al. ................... 148/133

FOREIGN PATENT DOCUMENTS 210961  12/1982  Japan ........................... 148/11.5 F Primary Examiner—L. Dewayne Rutledge
Assistant Examiner—Robert L. McDowell
Attorney, Agent, or Firm—Pollock, Vande Sande & Priddy

[57] ABSTRACT

For manufacturing zirconium alloy plates, more particularly for forming grids for holding nuclear fuel elements, a strip is obtained by hot rolling, then cold rolling, with a high cold hammering rate, then the strip is subjected to reheating for removing the tension at a temperature lower than the recrystallization temperature. Plates are cut out in the transverse direction of the strip.

5 Claims, 1 Drawing Figure

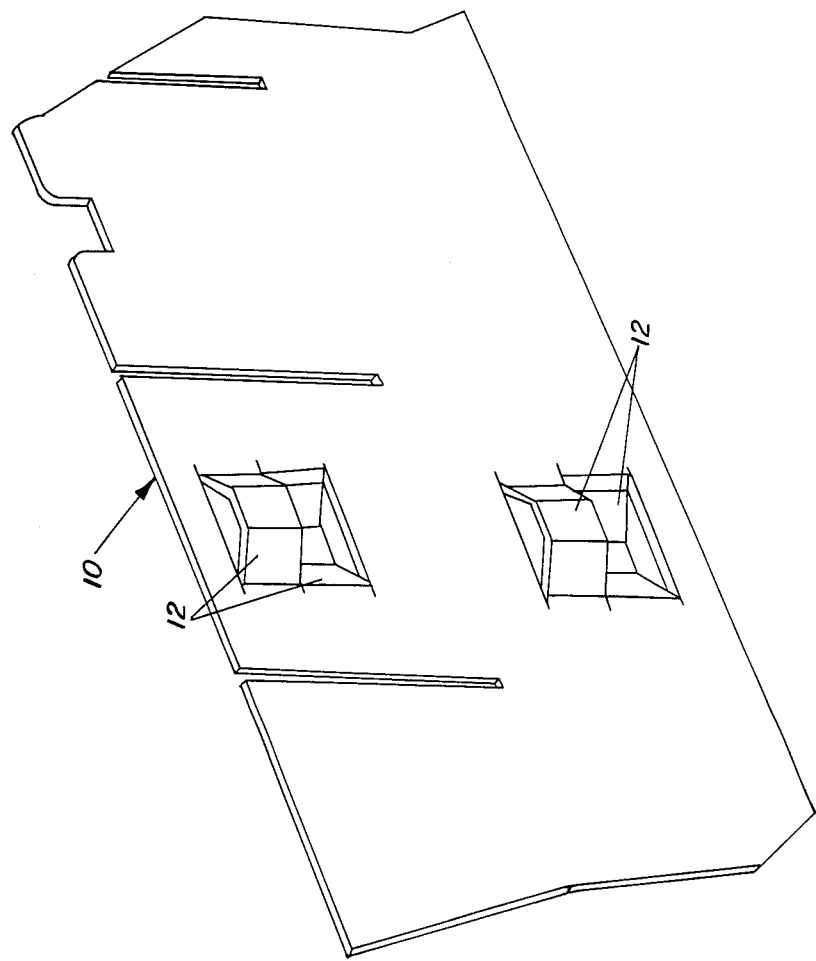

METHOD OF MANUFACTURING ZIRCONIUM ALLOY PLATES

BACKGROUND OF THE INVENTION

The invention relates to the manufacture of zirconium alloy plates for use in nuclear reactor structural members which, consequently, must retain mechanical properties at high temperatures and chemical resistance to the environment in a nuclear reactor vessel (boron containing water of the primary circuit in a pressurized water reactor).

Zirconium base alloys, particularly those known by the trademark "Zircaloy", are widely used in nuclear reactors. Among those presently widely used is "Zircaloy 4" which comprises—in addition to zirconium—tin, iron and chromium, whereas the nickel content is very low, usually less than 70 ppm. "Zircaloy 4" may also comprise, in addition to inevitable impurities, additive elements, and more particularly carbon which, in the solubilized state in an amount between 80 and 270 ppm, improves the mechanical properties.

PRIOR ART

Numerous treatments have already been proposed for improving the mechanical or chemical properties of zirconium base alloys. Such treatments are disclosed, e.g., in French Pat. Nos. 1 525 276, 1 327 734, 2 307 884, 2 019 129 and 2 219 979. Most of the treatments are for imparting to the alloy the high resistance to high temperature creep desirable for reducing the risks of failure of a sheath or can formed from this alloy. However, these result are usually obtained at the expense of other properties of the alloy, and in particular have an unfavorable influence on the possibilities of cold working the alloys as sheets.

In addition, British Pat. No. 997,761 discloses a process specifically for improving niobium containing zirconium alloys, quite different from "Zircaloy 4". It includes an essential step of introducing oxygen and aging which is closely related to oxygen introduction and later quenching. French Pat. No. 1 307 550 also discloses a heat treatment of niobium containing zirconium alloys for improving corrosion resistance. However, it appears that it is carried out at a temperature above the crystallization point.

SUMMARY OF THE INVENTION

It is an object of the invention to provide an improved method of manufacturing plates in which the final step consists in cold shaping of a strip. It is a more specific object to provide for this purpose strips which have both the properties required for forming plates of a satisfactory quality and a ductility allowing final shaping by cold working processes such as pressing and stamping.

To this end, there is provided a method in which a strip is formed by hot rolling, then by cold rolling with a high rate of cold hammering, until it has the thickness of the plates to be formed by cutting and cold forming, wherein the strip is subjected to reheating for releasing internal tensions at a temperature less than the recrystallization temperature of the zirconium base alloy.

More especially in the case where the plates are intended to be integrated in a grid for holding nuclear fuel elements and must, for that purpose, have bosses for engaging with the elements, the plates are cut transversely with respect to the rolling direction of the strip so as to obtain high mechanical strength, for withstanding the forces occurring during an earthquake, and for preventing creep.

The invention is more particularly applicable to alloys the "Zircaloy 4" type and, in this case, the reheating will be carried out for 2 to 100 hours between 440° and 490° C., generally at a temperature of the order of 460° C. for a duration of the order of 24 hours. Such treatment provides properties close to those of the cold hammered metal, the recrystallization of "Zircaloy 4" beginning from about 500° C.

BRIEF DESCRIPTION OF THE DRAWING

The invention will be better understood from reading the following description of a method particularly usable for forming plates intended for grids of the kind forming the subject of French Pat. No. 2 533 352, to which reference may be made.

The single accompanying FIGURE is a schematic representation of a plate to which the invention may be applied.

DETAILED DESCRIPTION OF THE INVENTION

Referring to the drawing, plate 10 comprises, at regular intervals, bosses 12 formed by pressing in two cold passes (stamping and punching). These plates, having a thickness which is usually 0.3 or 0.4 mm, form the internal spacers of the grid, whose frame is made from a thicker strip usually 0.6 or 0.8 mm.

Once formed, the plates must have low transverse growth under radiation, a high mechanical strength and an absence of creep of the bosses. To fulfill this latter condition, it may be assumed that the strip from which the plates 10 are cut out must have the following minimum characteristics at 315° C.:

elastic stress limit E at 0.2%: 250 MPa;
breaking load: 280 MPa.

Furthermore, the uniformly distributed stretchability under traction at ambient temperature must be at the minimum 4% so as to allow shaping by stamping and bending, particularly for forming bosses 12 of a kind shown in the drawing. This stretchability may be obtained by completely recrystallizing the zircaloy by reheating for removing the major part of the dislocations introduced by the cold rolling work; the mechanical characteristics at 315° C. then decrease, and in particular the elastic stress limit at 0.2% falls to about 90 MPa; this degradation of the mechanical characteristics would result in permanent plastic deformation of the plate during loading of the elements in the grid. Accentuation of the degradation following irradiation would result in a decrease of the force holding the fuel elements.

The method whose successive steps will be described hereafter, provides, when it is applied to Zircaloy 4 whose nominal contents are about 1.5% Sn, 0.21% Fe, 0.10% Cr, a satisfactory compromise between the cold deformation properties and the resistance when hot under irradiation.

Zircaloy 4 ingots are generally used, obtained by melting in a vacuum or in an inert atmosphere, which are transformed by rolling or forging from the range $\beta$ so as to obtain a billet whose thickness is of about 100mm. Using phase $\alpha$ and $\beta$ hot rolling operations which may be of the kind described in French Pat. No. 1 525 276 at a temperature between 850° and 950° C., the thickness is brought down to a value between 20 and 30 mm. The strips thus obtained are homogenized and quenched in phase $\beta$, then hot rolled so as to bring them down to a thickness of 6 mm, for example. A series of cold rolling, grease removal, reheating in a vacuum, and recrystallization cycles finally allow a thickness to be obtained which, in the case where the above mentioned plate thicknesses are desired, may be 0.9 mm for spacer plates and 1.25 mm for frame plates.

Then a final mechanical treatment is carried out formed by cold rolling whose cold hammering rate is at least 35%, which brings the thickness from 1.25 to 0.6 mm or from 0.9 to 0.4 mm. This cold hammering rate with uniaxial deformation may exceed 50% using equipment now available, which allows a constant ratio to be maintained between the traction force exerted during cold rolling and the compression in the thickness direction.

The strip thus obtained has extremely favorable mechanical and chemical properties from the point of view of its subsequent behavior in a reactor. But its ductility is insufficient to allow cold stamping. This ductility is improved and made sufficient by subjecting the strips to reheating for removing stress of long duration, typically about 24 hours, at a temperature of 460° C., i.e., at a value less than that at which recrystallization begins. This reheating, like the other high temperature operations, is carried out in a vacuum so as to avoid oxidization.

The strip thus obtained has a texture having:

a mis-orientation of 15° to 20° from the normal to the base plane, from the normal direction towards the rolling direction, a direction ($10\overline{1}0$) parallel to the rolling direction.

These components of the texture are favorable to deformation in the rolling direction, and to a growth under irradiation which is weaker in the transverse direction of the strip than in the longitudinal direction of the strip. To take this property into account, the plates will be cut up in the transverse direction so as to limit the extension under irradiation and so as to obtain pressings free of porosity and cracks.

Strips should consequently be formed having a width at least equal to the length of the plates, i.e., 240 mm for the assemblies usually used at the present time.

What is claimed is:

1. A method of manufacturing Zirconium alloy plates having abutment bosses, for use in a grid for holding nuclear fuel elements in a fuel assembly, comprising the steps of
   (a) forming a Zirconium alloy strip by hot rolling;
   (b) cold rolling said strip;
   (c) subjecting the cold rolled strip to reheating to remove tensile stresses at a temperature lower than the recrystallization temperature for a time sufficient to remove internal stresses;
   (d) cutting out the plates in said strip with the length of said plates transverse to the rolling direction of the strip so as to obtain high mechanical strength and low creep; and
   (e) cold forming said bosses in said plates.

2. The method of claim 1, wherein the zirconium alloy plates are prepared by hot rolling of $\beta$ phase ingots containing tin, iron and chromium, in addition to zirconium and inevitable impurities.

3. The method of claim 2, wherein said ingots further contain from 80 to 270 ppm of carbon.

4. The method of claim 2, wherein said reheating is carried out at a temperature of from 440° to 490° C. for 2 to 100 hours.

5. The method of claim 4, wherein said reheating is carried out at a temperature of approximately 460° C. for a duration of about 24 hours.

* * * * *